May 19, 1964  P. R. F. DANLEY ETAL  3,133,299
PAINT BRUSH
Filed May 28, 1962  3 Sheets-Sheet 1

INVENTORS
Philip R. F. Danley
BY John A. Pharris
Attys

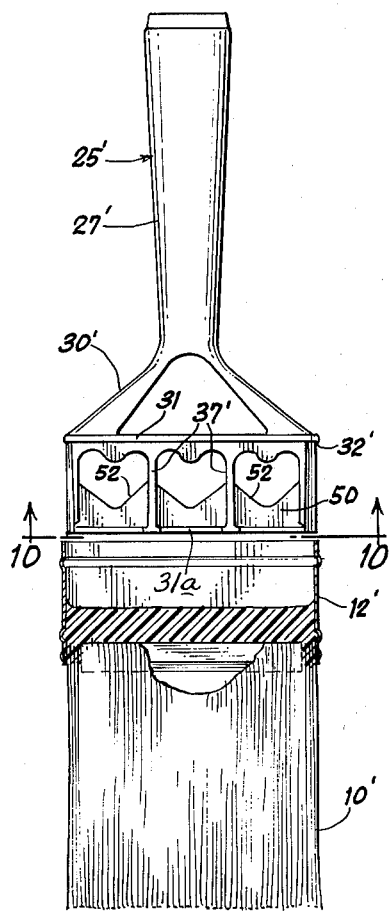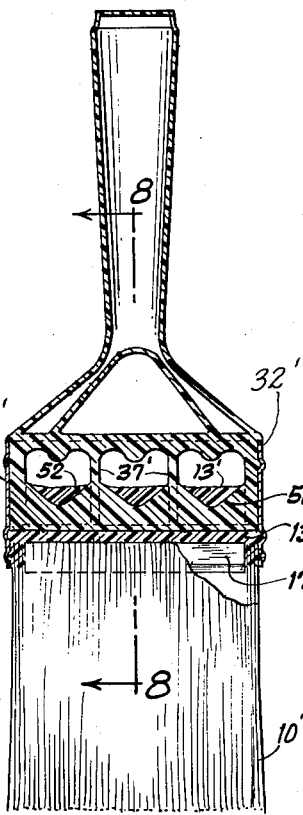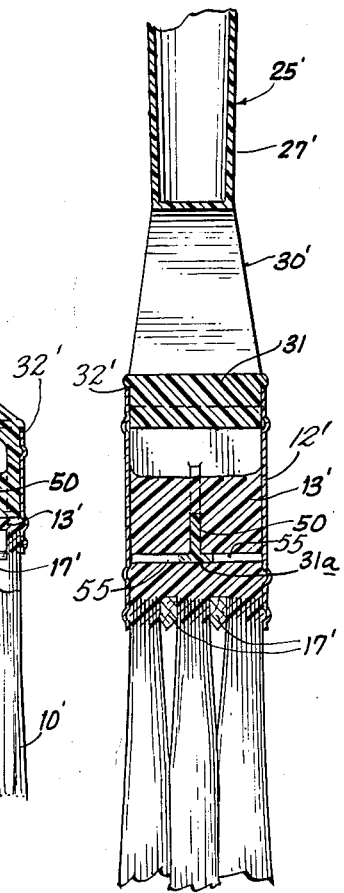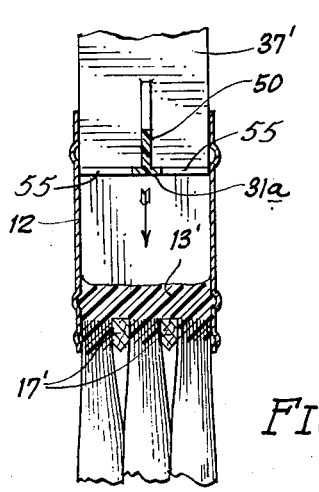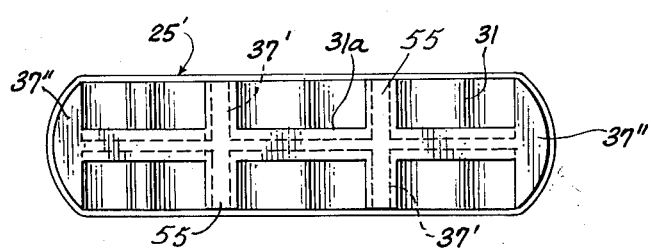

May 19, 1964 P. R. F. DANLEY ETAL 3,133,299
PAINT BRUSH
Filed May 28, 1962 3 Sheets-Sheet 3
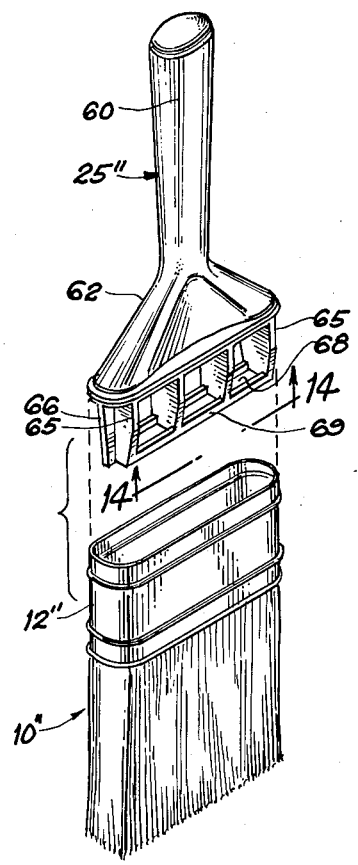
FIG. 11
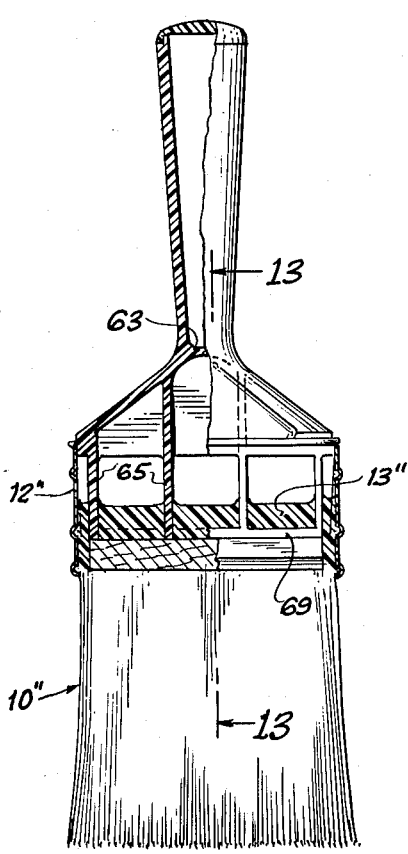
FIG. 12
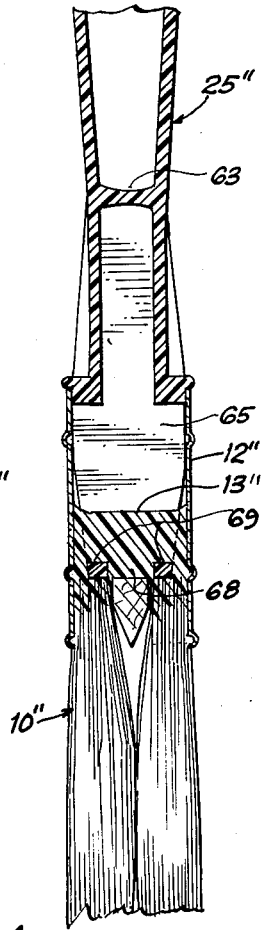
FIG. 13
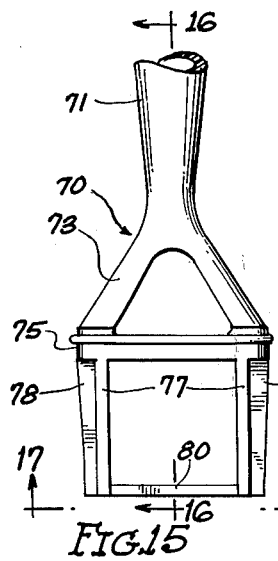
FIG. 15
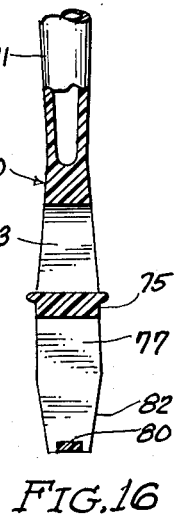
FIG. 16
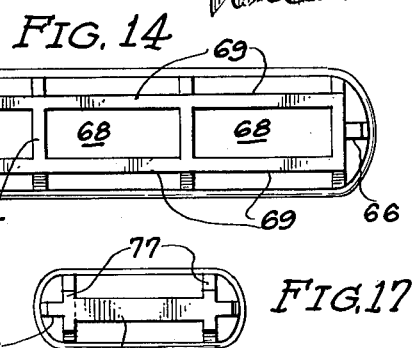
FIG. 14
FIG. 17
INVENTORS
Philip R. F. Danley
John A. Pharris
BY
Attys

United States Patent Office 3,133,299
Patented May 19, 1964

3,133,299
PAINT BRUSH
Philip R. F. Danley, Lake Forest, Ill., and John A. Pharris, Milwaukee, Wis., assignors to Sears, Roebuck and Co., Chicago, Ill., a corporation of New York
Filed May 28, 1962, Ser. No. 198,163
7 Claims. (Cl. 15—193)

This application is a continuation-in-part of our co-pending application, Serial No. 140,756, filed September 26, 1961, now abandoned.

Our invention relates to paint brushes, and has to do more particularly with an improved construction utilizing a novel type of handle preferably formed of moldable material, such as a suitable synthetic plastic. More particularly, our invention relates to the combination of such a handle with a ferrule and a bristle knot in a novel unitary construction.

For many decades paint brushes have generally followed a more or less standard design employing a wooden handle to which is attached a metal ferrule carrying a bristle knot. Such an arrangement was long considered economical to fabricate and generally satisfactory.

However, with increased labor costs required for the production of wooden handles and increasing scarcity of wood, it has been considered highly desirable to find other materials which might be substituted for the standard wooden handle. Various materials and constructions have been suggested but none has been entirely satisfactory.

In Pettengill Patent No. 2,532,780, granted December 5, 1950, it is suggested that a paint brush handle be formed as a hollow casting of a suitable light-weight metal such as magnesium, the handle being attached to a standard bristle-carrying ferrule by means of an intermediate wooden block for receiving the brads which attach the ferrule to the handle. Since the issue of that patent the market has seen the appearance of somewhat similar brushes utilizing a synthetic plastic handle in lieu of the metal disclosed by Pettengill, also utilizing a wooden block. While brushes of this type represent some advantages as compared with the standard wooden-handled brush, they nevertheless have not been an entirely satisfactory solution of the problem because of the necessary use of an intermediate wooden block to receive the nails or other fastening elements, adding to the cost of materials and labor.

Patent No. 3,023,439, granted March 6, 1962, to Philip R. F. Danley, one of the present inventors, represents a marked improvement over said Pettengill patent, disclosing the combination of a molded handle with a ferrule carrying a bristle knot, the ferrule being secured directly to the handle portion by means of brads or the like and eliminating the intermediate wooden block required in the Pettengill construction.

The present invention represents still a further advance in the art in that the securing members, such as brads or the like required to secure the handle to the ferrule in the said earlier constructions, are eliminated.

Various prior attempts have been made to eliminate the objectionable features, above referred to, of securing together the various parts of a brush, i.e. handle, ferrule and bristle knot, by means of nails or similar fastening means. For example, in Hardman et al. 2,849,741, although the brads were eliminated and the parts secured together by cement or the like, this is accomplished by providing a peculiar type of molded ferrule having a transverse wall or partition therein, thus introducing a cost factor which practically cancels out any cost advantage achieved by departing from the standard nailed construction.

The prior art also shows various suggestions for securing the bristle knot within a ferrule by means of auxiliary members embedded in plastic or the like, such as Hervey 2,562,716; Maxwell 2,840,841, etc., and utilizing a standard metal ferrule nailed in the usual way to the handle. While these various constructions may have their advantages from the standpoint of strength and rigidity, they contribute little or nothing to reduction of cost because of retaining the orthodox nailing.

Our invention contemplates a paint brush comprising only three major elements, viz., (1) a ferrule of the old and substantially standard character, which may consist of a simple sheet metal sleeve; (2) a bristle knot embedded in a body of plastic within the ferrule, and (3) a handle part, preferably of hollow molded material, having an integral joining portion also embedded in said plastic body within the ferrule and securing in a rugged unit the ferrule with the bristle knot together with the handle part, without the necessity for brads or any other extraneous securing means. Thus, a great saving in cost is effected.

According to preferred embodiments of our invention, we provide integrally with a handle a securing or joining element to be disposed within the ferrule and adapted to be embedded, at least partially, within a body or matrix of plastic material, said securing element comprising a plurality of spaced finger-like members extending generally longitudinally of the handle, with narrow elements extending transversely of said finger and of said handle and adapted to provide seats or ledges to be embedded in the aforesaid body or matrix of plastic material, thus insuring a firm bond between the handle part and the bristle part (including ferrule), so that accidental displacement thereof, even under the most rugged conditions of use, will be highly unlikely, while employing a minimum quantity of molded plastic.

In the manufacture of brushes embodying our invention, the bristle knot is arranged with the ends of the bristles inside the ferrule, the free or working ends extending outwardly therefrom; plastic material in fluid condition is disposed in and over the aforesaid extremities of the bristles within the ferrule; the above mentioned securing portion of the handle part is then inserted into the semi-fluid plastic body within the ferrule, which will tend to flow over and around the above mentioned fingers and ledges, forming a firm interlock after curing and hardening.

Referring now to the drawings forming a part of this specification and illustrating certain preferred embodiments of our invention.

FIG. 6 is an exploded elevational view of another embodiment of a brush embodying our invention;

FIG. 7 is a sectional view, corresponding to FIG. 2 of the embodiments of FIG. 6;

FIG. 8 is an enlarged fragmentary section taken substantially along line 8—8 of FIG. 7;

FIG. 9 is a fragmentary sectional view corresponding to FIG. 4, of the embodiment of FIGS. 6–8;

FIG. 10 is an enlarged plan view taken substantially along line 10—10 of FIG. 6;

FIG. 11 is an exploded perspective view of still another embodiment of our invention;

FIG. 12 is a longitudinal section of the embodiment seen in FIG. 11;

FIG. 13 is a fragmentary enlarged sectional view taken substantially along the line 13—13 of FIG. 12;

FIG. 14 is a fragmentary plan view on an enlarged scale, taken along the line 14—14 of FIG. 11;

FIG. 15 is a fragmentary elevational view of a handle portion constituting still another embodiment of our invention;

FIG. 16 is a sectional view taken substantially along the line 16—16 of FIG. 15, and FIG. 17 is a plan view taken substantially along the line 17—17 of FIG. 15.

Figure 1:
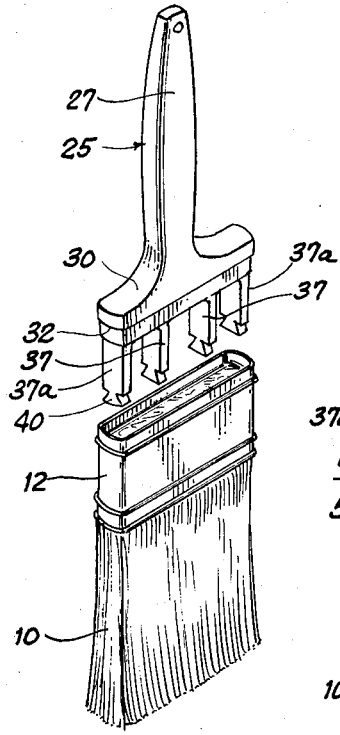
FIG. 1 is an exploded view of a paint brush, constituting one embodiment of our invention.
Figure 2:
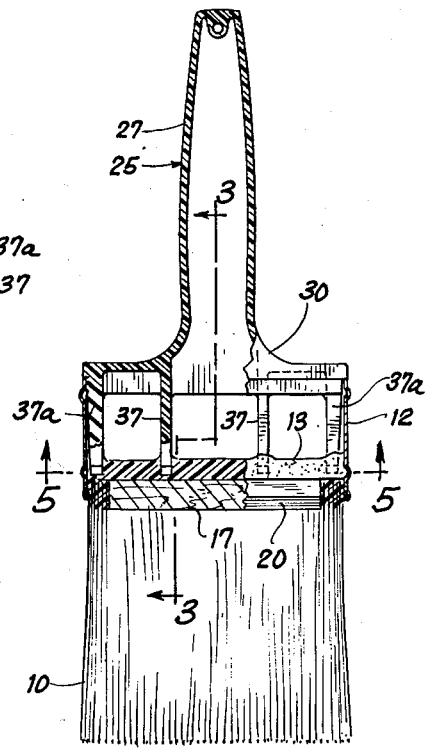
FIG. 2 is a longitudinal sectional view taken through the major plane of the brush of FIG. 1 in assembled condition.

Referring to the embodiment of FIGS. 1–5 inclusive, the numeral 10 represents a knot of bristles mounted within a ferrule 12 which may be of standard type formed of sheet metal or the like. The upper end portions of the bristles are embedded within a body of plastic 13 in the lower portion of ferrule 12. A separator strip 17, of wood or other suitable material, may be disposed medially of the bristle knot 10 and likewise is embedded in the body of plastic so as to separate the bristles 10 into two portions, 10a and 10b, as seen best in FIGS. 3 and 4. Strip 17, as seen in FIG. 2, terminates short of the ends of the knot 10. The lower extremity of the strip 17 may be beveled as indicated at 20 to improve the working quality of the bristles.

The handle portion of the brush, indicated generally by numeral 25, is formed of suitable moldable material, preferably of a suitable synthetic plastic, and comprises a hollow stem portion 27 carrying an enlarged neck portion 30 which is undercut, as at 32, to provide a shoulder seating the upper edge of ferrule 12. A series of generally parallel fingers 37 extend from neck portion 30 generally parallel to the stem 27. While in this embodiment we have shown four fingers 37, this number may obviously be more or less. It will be noted (FIG. 5) that the end fingers 37a are curved on their outer faces to conform to the curvature of the ferrule.

It will be noted that the free extremities 40 of fingers 37 are dovetailed.

Figure 3:
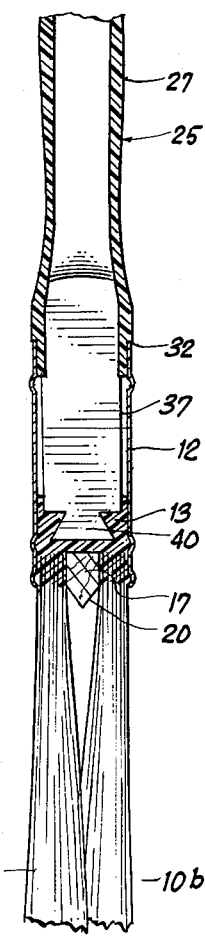
FIG. 3 is a fragmentary longitudinal sectional view on an enlarged scale, taken substantially along the line 3—3 of FIG. 2.
Figure 4:
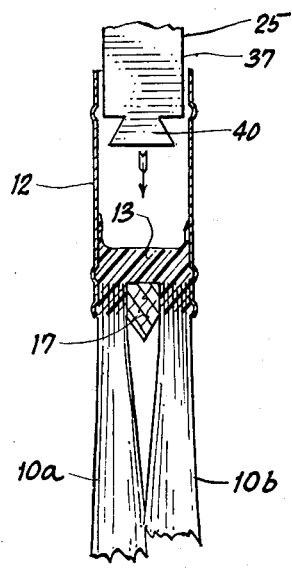
FIG. 4 is a fragmentary sectional view similar to FIG. 3 but showing the parts in the course of assembly.
Figure 5:
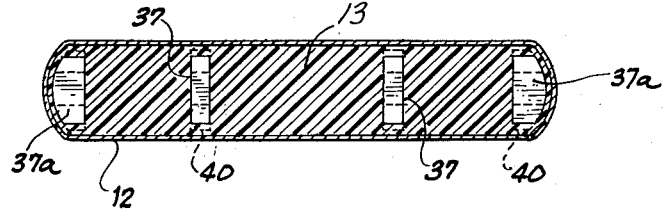
FIG. 5 is a sectional view taken substantially along the line 5—5 of FIG. 2.

In the production of brushes conforming to the embodiment just described, after the bristle knot 10 is disposed within the ferrule 12, as seen in FIG. 4, with a substantial body of soft epoxy resin or the like disposed above the body of bristles and distributed through the end portions thereof, the lower or securing part of the handle portion is then moved into the ferrule so that the fingers 37, or at least the dovetailed extremities 40 thereof, are embedded within the soft body 13 of plastic. As seen in FIG. 3, the plastic flows around and over the undercut portions of the fingers and is thereafter cured or hardened in the usual manner.

After the curing operation it will be found that the handle is securely attached to the ferrule and bristle body without any need for nails, rivets or other extraneous securing means. The parts are so firmly mounted together that they are practically inseparable under severe conditions of use and the effective life of the brush is essentially that of the bristles.

Turning to FIGS. 6–10, inclusive, the embodiment here illustrated comprises a bristle knot 10' which is substantially similar to the knot 10 of the embodiment described above, except that we provide here a pair of wedge-shaped separators 17' instead of a single bristle separator as in the former embodiment. As in the first embodiment, the knot is embedded in a body of plastic 13' disposed in ferrule 12'.

The handle part 25' comprises a stem portion 27' and a neck portion 30' which is hollow and communicates with the stem 27', as in the first embodiment. In this case, however, the neck 30' is skeletonized, as seen clearly in FIGS. 6 and 7.

Integral with neck portion 30' is a cross bar portion 31, providing a shoulder 32' engageable with the upper edge of ferrule 12'. Spaced from and substantially parallel to cross bar 31 is a second cross bar 31a of reduced width as compared with cross bar 31, as seen in FIGS. 8 and 9, the two cross bars being connected by a plurality of substantially parallel fingers 37'. A medial web 50 integral with cross bar 31a and joining fingers 37' extends upwardly a relatively short distance toward cross bar 31, said web having scalloped edges 52, as seen in FIGS. 6 and 7, whereby the plastic material 13', when in a fluid state, may flow over and seat on this surface as well as on crossbar 31a, locking the bristle knot, ferrule and handle together firmly, as in the first embodiment. The web 50 functions additionally as a reinforcing means. Also, a plurality of integral tines 55 extend transversely from cross bar 31a (FIGS. 8 and 9).

Referring to FIG. 10, it will be seen that in this embodiment also the end fingers 37'' are curved to conform to the curvature of the ferrule at the sides thereof, in order to make a snug fit. This feature facilitates properly positioning the elements together while the plastic is soft.

It will be apparent that in the embodiments described negative areas are provided for the plastic material to flow over and into in order to provide an interlock. In lieu of the embodiments illustrated in the drawings thereto, we might provide holes or cavities or recesses in the fingers 37 into which the plastic material might flow and be seated. Furthermore, in lieu of bar 31a of the form shown in FIGS. 6–10, permitting the plastic to flow over and seat on the bar, we might provide transverse lugs, bosses or the like at or near the outer extremities of fingers 37', extending either parallel to bar 31 or transversely thereto, so as to provide seats for the plastic. Such members may be in addition to passages or recesses in fingers 37', if desired.

Referring now to the embodiment seen in FIGS. 11–14, inclusive, the bristle part 10'', comprising the usual bristle knot, ferrule 12'' and plastic body or matrix 13'', is essentially the same as in the other embodiments described above.

The handle part, indicated generally by reference numeral 25'', comprises a stem portion 60 joined to a generally triangular neck portion 62, said stem and neck portions being hollow and preferably molded of a suitable synthetic plastic or the like and having a wall 63 serving as a dam to prevent seepage of paint into the stem in the event that any should flow past the ferrule and into the neck.

A plurality of spaced fingers 65 extend longitudinally of the handle part, being integrally jonied at their bases and edges to the neck portion 62 The outermost fingers 65 have laterally projecting ribs 66 to aid in properly positioning the handle portion relative to ferrule 12''.

The extremities of said fingers 65 opposite from stem 60 are integrally joined to parallel transverse ribs 69, said ribs being integrally joined to and extending between said fingers 65 and being spaced from each other, as seen best in FIGS. 11 and 14, whereby, when these parts are submerged in the semi-fluid body or matrix 13'' of plastic or the like, said ribs 69 and the outer extremities of fingers 65 will extend into and be covered by said plastic material, the latter flowing through the spaces 68 between said ribs 69. Thus, said ribs will be seated well within the matrix 13''.

It will be seen that plastic material 13'', after being cured and solidifying, engages all sides of ribs 69, as well as the sides and edges of fingers 65, making for an extremely secure bond between the handle part and bristle part, so that the finished brush can endure extremely rough usage without likelihood of disengagement of said parts, all without the necessity for any extraneous securing means such as the customary brads or the like.

Referring now to the embodiment seen in FIGS. 15–17, inclusive, this form of handle part is especially adapted for, but not restricted to, relatively small brushes, such as those used for painting trim on the inside of rooms and the like.

In this embodiment handle part 70 has a hollow stem portion 71 and a generally triangular and skeletonized neck portion 73. Joined to neck 73 is a transverse shouldered wall portion 75 adapted to seat the upper edge of a ferrule of the usual type.

Extending longitudinally from wall portion 75 is a pair of finger-like members 77 generally similar to the end fingers seen in FIGS. 11–14, having laterally projecting ribs 78 as in said other embodiment. Joining the outer extremities of said fingers 77 is a rib 80 which, as seen in FIGS. 16 and 17, is somewhat narrower than the fingers 77. It will also be noted from FIG. 16 that the lower portions of fingers 77 taper as at 82 to permit the flow of semi-fluid plastic around said fingers and over and around ribs 80. Thus, in this embodiment, as in the other forms described above, a firm union will be established between the handle part and the bristle part.

Various other changes coming within the spirit of our invention may suggest themselves to those skilled in the art; hence, we do not wish to be limited to the specific embodiments shown and described or uses mentioned, but intend the same to be merely exemplary, the scope of our invention being limited only by the appended claims.

We claim:

1. A brush comprising a generally hollow, integrally molded handle, a sleeve-like ferrule, and a bristle knot having a free end and a fixed end with the latter within said ferrule and with the remainder thereof extending from one end of said ferrule, said handle being formed with a hollow stem at one end thereof, an enlarged neck at an intermediate part thereof and a locking portion at the opposite end thereof, said locking portion comprising a plurality of integral relatively tenuous and genererally parallel members extending from the neck longitudinally of the brush across substantially the thickness thereof at least adjacent to the neck and spaced from each other at least adjacent to the marginal edges of the brush to define a void space adjacent to the walls of said ferrule, at least one narrow transverse elongate element interconnecting the free ends of said members and forming a keying ledge for the embedment of a plastic matrix therearound, the opposite end of said ferrule adapted to embrace said locking portion of said handle and the portion of the neck adjacent thereto so that the fixed end of the bristle knot is closely adjacent to the free extremity of said locking portion, and a body of solidified plastic material disposed within said ferrule adapted to cover at least the bottom of said space and narrow interconnecting element, thereby to embed the latter into a unitary matrix confined by the walls of said ferrule adjacent to the fixed end of the bristle knot, so as to bind all of said parts firmly together without need for extraneous securing means.

2. A brush as set forth in claim 1 wherein said parallel members adjacent to the marginal edges of the brush are each provided with an integral laterally projecting longitudinal rib on the external face thereof adjacent to each marginal edge of the ferrule to provide additional keying surfaces for the plastic matrix thereat.

3. A brush comprising a generally hollow, integrally molded handle, a sleeve-like ferrule, and a bristle knot having a free end and a fixed end with the latter within said ferrule and with the remainder thereof extending from one end of said ferrule, said handle being formed with a hollow stem at one end thereof, an enlarged neck at an intermediate part thereof and a locking portion at the opposite end thereof, said locking portion comprising a plurality of integral relatively tenuous and generally parallel members extending from the neck longitudinally of the brush across substantially the thickness thereof at least adjacent to the neck and spaced from each other between the marginal edges of the brush to define a plurality of chambers adjacent to the walls of said ferrule, an integral network of narrow molded elements extending transversely to said members adjacent to the ends thereof remote from said handle for interconnecting the free ends of said members and to form keying ledges for the embedment of a plastic matrix therearound, the opposite end of said ferrule adapted to embrace said locking portion of said handle and the portion of the neck adjacent thereto so that the fixed end of the bristle knot is closely adjacent to said integral network, and a body of solidified plastic material disposed within said ferrule adapted to bridge the spaces within said chambers and integral network and embedding the latter into a unitary matrix with the fixed end of the bristle knot so as to bind all of said parts firmly together without need for extraneous securing means.

4. A brush as set forth in claim 3 wherein said parallel members adjacent to the marginal edges of the brush are each provided with an integral laterally projecting longitudinal rib on the external face thereof adjacent to each marginal edge of the ferrule to provide additional keying surfaces for the plastic matrix thereat.

5. A molded integral brush handle comprising a hollow stem at one end thereof and a locking portion at the opposite end thereof for securely integrating the handle within a ferrule, from one end of which is adapted to extend a bristle knot anchored within the ferrule, said locking portion comprising a plurality of integral relatively tenuous and generally parallel members extending towards the end of the handle opposite to the stem longitudinally of the brush across substantially the thickness thereof for at least the major portion of their length, said members being spaced from each other to adapt them for disposition at least adjacent to the marginal edges of the brush to define a void space adjacent to the walls of said ferrule, at least one narrow transverse elongate element interconnecting the free ends of said members adapted to form a keying ledge for the embedment of a plastic matrix therearound when said locking portion is inserted into the opposite end of the ferrule and the body of plastic material within the ferrule adjacent to the bristle knot hardens within said void space and above said transverse elongate element.

6. A molded brush handle as set forth in claim 5 wherein said parallel members adapted to be disposed adjacent to the marginal edges of the brush are each provided with an integral laterally projecting longitudinal rib on the external face thereof adjacent to each marginal edge of the ferrule to provide additional keying surfaces for the plastic matrix thereat.

7. A molded brush handle as set forth in claim 5 wherein said tenuous members are narrowed adjacent to the free ends thereof whereat is connected said elongate element to provide additional space for the plastic matrix.

References Cited in the file of this patent

UNITED STATES PATENTS

| | | |
|---|---|---|
| 2,508,931 | Simms | May 23, 1950 |
| 2,840,841 | Maxwell | July 1, 1958 |
| 3,023,439 | Danley | Mar. 6, 1962 |
| 3,076,989 | Daw | Feb. 12, 1963 |

FOREIGN PATENTS

| | | |
|---|---|---|
| 156,999 | Sweden | Nov. 27, 1956 |
| 874,950 | Great Britain | Aug. 16, 1961 |
| 884,786 | Germany | July 30, 1953 |
| 1,185,047 | France | Feb. 9, 1959 |